United States Patent [19]
Dewar et al.

[11] Patent Number: 5,303,215
[45] Date of Patent: Apr. 12, 1994

[54] SELF-TIMING OPTIC LATHE

[76] Inventors: Stephen W. Dewar, 296 Richmond St. W.#601, Toronto, Ontario, Canada, M5V 1X2; Marvin G. Breyfogle, Y301, 1605 Sherrington Pl., Newport Beach, Calif. 92663

[21] Appl. No.: 493,954

[22] Filed: Mar. 15, 1990

[30] Foreign Application Priority Data

Mar. 20, 1989 [GB] United Kingdom ............... 8906353

[51] Int. Cl.$^5$ ................................................ G11B 7/00
[52] U.S. Cl. ................................ 369/44.25; 369/32; 369/54; 369/189; 369/111
[58] Field of Search .................... 369/32, 44.11, 44.14, 369/44.17, 44.19, 44.25, 44.26, 44.27, 53, 54, 50, 240, 264, 266, 189, 111

[56] References Cited

U.S. PATENT DOCUMENTS

| | | |
|---|---|---|
| 1,638,424 | 8/1927 | Webb . |
| 2,314,345 | 3/1943 | Cortella . |
| 2,489,685 | 11/1949 | Sultan . |
| 2,554,347 | 3/1951 | Rice . |
| 2,567,092 | 9/1951 | Williams . |
| 2,658,762 | 11/1953 | Begun . |
| 2,867,694 | 1/1959 | Pearson, Jr. . |
| 2,925,279 | 2/1960 | Frontaine . |
| 3,331,144 | 7/1967 | Hahn . |
| 3,366,733 | 1/1968 | Frohbach ............................ 358/342 |
| 3,716,845 | 2/1973 | Chaffin, IV ......................... 369/111 |
| 4,094,013 | 6/1978 | Hill et al. ............................. 360/77 |
| 4,107,528 | 8/1978 | Silverman ........................... 250/317 |
| 4,225,873 | 9/1980 | Winslow .............................. 369/54 |
| 4,228,326 | 10/1980 | Dakin et al. ...................... 179/100.1 |
| 4,247,976 | 2/1981 | Reuter ................................ 369/264 |
| 4,260,858 | 4/1981 | Beiser ................................. 369/111 |
| 4,295,162 | 10/1981 | Carlsen ............................... 369/111 |
| 4,406,000 | 9/1983 | Shoji et al. ......................... 369/111 |
| 4,437,181 | 3/1984 | Kishima .............................. 369/33 |
| 4,456,914 | 6/1984 | Winslow ............................. 369/116 |
| 4,494,226 | 6/1985 | Hazel et al. .......................... 369/54 |
| 4,530,083 | 7/1985 | Ishihara .............................. 369/240 |
| 4,546,461 | 10/1985 | Isobe ................................... 369/240 |
| 4,685,096 | 8/1987 | Romeas ............................... 369/59 |
| 4,734,901 | 3/1988 | Murakami ........................... 369/59 |
| 4,754,339 | 6/1988 | Nagai et al. ......................... 369/32 |
| 4,931,889 | 6/1990 | Osafune .............................. 369/32 |
| 5,010,539 | 4/1991 | Terashima et al. .................. 369/50 |

OTHER PUBLICATIONS

Philips Technical Review, vol. 33, pp. 178-193 1973.
Philips Technical Review, vol. 40, No. 6, 1982, specifically M. G. Carasso et al., "The Compact Disc Digital Audio System", 1955 and J. P. J. Heemskerk & K. A. Schouhammer Immink Compact Disc: system aspects and modulation 157-164.
"Mechanisms and Dynamics of Machinery" p. 26, Mabie and Ocvirk 3rd Edition, John Wiley & Sons.

*Primary Examiner*—Tommy P. Chin
*Assistant Examiner*—Khoi Truong
*Attorney, Agent, or Firm*—Alan T. McCollom

[57] ABSTRACT

A self-timing optic lathe, comprising a turntable for rotating an object disc, an offset code track carried by the turntable and embodying an encoded control signal, a read laser for optically reading the encoded control signal from the code track, a write laser for optically recording an information signal on the object disc, an optical carriage for moving the write laser and the read laser in a radial direction across the turntable relative to the code track, and a timing and control circuit connected to the write laser and the read laser for reading the control signal and in response controlling rotation of the turntable and operation of the write laser to record the information signal independently of the speed of rotation of the turntable.

23 Claims, 6 Drawing Sheets

SELF-TIMING OPTIC LATHE

FIELD OF THE INVENTION

The present invention relates generally to recording and measurement systems, and more particularly to a self-timing optic lathe for recording and encrypting data on an optical medium without the requirement of expensive and complicated apparatus for maintaining synchronism in reference to time.

BACKGROUND OF THE INVENTION

In recent years, considerable effort has been expended in developing improved methods and apparatus for optically recording on and reading from a suitable optical media such as video discs and compact discs (CDs).

For example, Philips Technical Review, Volume 33, pages 187–193 and 197, and Philips Technical Review, volume 40, number 6, 1982, pages 151–164 provide examples of known optical recording technology.

Additionally, U.S. Pat. No. 4,107,528 (Silverman) discloses a system for directly transferring a preselected pattern of opaque and transparent areas in a first metal web to an underlying second web via optical means.

However, in order to initially record data onto the master web disc, complex apparatus and circuitry must be employed to ensure complete synchronism between the input data stream, speed of rotation of the disc, radial translation of the disc relative to the laser, and to control of the write laser etc.

U.S. Pat. No. 4,228,326 (Dakin et al) discloses a tracking control system for adjusting the angular velocity of an optical disc and the radial velocity of an optical transducer to be inversely proportional to the radius of the particular information track being recorded, whereby the track is moved at a constant linear velocity relative to the transducer for recording information of uniform density over the surface of the disc.

U.S. Pat. No. 4,546,914 (Winslow) teaches beam placement control in an optical disc recording system by means of a lead screw and translation drive.

The above discussed optical disc recording systems share a number of common requirements relating to encoding of data, data synchronization, disc formatting and data access and retrieval. Each of the above discussed systems provides for these requirements in different ways.

For example, the compact disc audio system (CD) described in the Philips Technical Review, Volume 40, encodes sound samples as a digital channel bit stream organized as "frames" which incorporate synchronization patterns. Such frames are recorded as a series of pits and lands, and the transition points between pits and lands are commonly known as "pit-edges". Patterns of pit-edges are formatted as a spiral track of pitch 1.6 μm, which track is designed to be scanned at a constant track velocity of 1.25 m/s. The Digital signal is read by timing the track speed via a crystal so that the intervals between pit-edges may be measured. The compact disc audio system is a non-return-to-zero system in which each pit-edge (whether the start of a pit or a land) counts as one and each channel-bit-long length of track (Tc) is counted as zero. By way of contrast, the Philips LaserVision TM system discussed in Philips Technical Review volume 33, pages 187–193, also employs spiral tracks comprised of pits and lands, but in this case the data is stored in analogue form. Similarly, the disc recording systems disclosed in U.S. Pat. No. 4,228,326 (Dakin et al) and U.S. Pat. No. 4,456,914 (Winslow) which encompasses concentric tracks and a control system whereby each track is designed to be recorded and scanned at a constant linear velocity.

As discussed above, one fundamental disadvantage of such prior art systems in the formation of recordings is the requirement for precise synchronization of various subsystems, including, but not limited to, the following: the source data stream; the operation of a laser or other energetic beam; the turntable rotation speed; and the radial translation drive by which the laser and the object disc are moved radially relative to one another. De-synchronization of any subsystem relative to the other subsystems can result in erroneous data recording.

While such prior art has been widely employed in recording master discs such as those used in the mass production of compact disc recordings, it is complex and expensive. These disadvantages have made the creation of unique or custom recordings of data extremely difficult.

Numerous attempts have been made at simplifying the complex synchronization problems of prior art systems. Although some such attempts have resulted in technically and economically satisfactory systems for the creation of masters employed in the mass production of optical discs, such systems have been neither simple enough nor economical enough to warrant their application to the problem of unique production of compact disc recordings.

One alternative prior art approach reduces the complexity of the recording system by employing a prerecorded guide track on the object disc. According to this prior art approach, a two stage recording procedure is followed. First, the timing and format information is recorded on the object disc during the manufacturing process or, alternatively, when the object disc is formatted upon first installation in the system. Next, an information signal is recorded on the disc. Synchronization, track formatting, location and, some applications data addresses can be determined with comparatively simple, inexpensive and relatively reliable servosystems. Despite the theoretical promise of this prior art technique, difficulties have arisen in keeping the information signal recording process from interfering with or damaging the prerecorded guide track.

Additional prior art techniques have been developed for avoiding the inadvertent recording of an information signal over the guide track. One such technique provides for two mutually adjacent tracks, one reserved for information storage and one reserved for the prerecorded guide track. This approach has not been totally satisfactory because, despite the track separation, tracking error signals applied to scan the guide track may be affected by diffracted light from the beam employed in recording and/or reproducing the information signal on an adjacent track.

In response to this problem, U.S. Pat. No. 4,754,339 (Nagai et al) discloses an information recording disc prerecorded with a considerably more precise guide track, including address and pseudo-address data which it is claimed overcomes such difficulties.

A further alternative approach is described by U.S. Pat. No. 4,494,226 (Hazel et al). According to Hazel et al, a three beam optical memory system is provided for use with a specially chosen preformatting of the optical disc. This system employs a read-before-write beam which scans the track ahead of a write laser to, among other things, avoid over-writing of previously recorded data. A disadvantage of this system is that the cost of preformatting the object disc increases the unit cost of the data stored.

It will be appreciated from the foregoing that there is a need for a system which can simplify the reliable production of optical recordings and do so at an economical cost.

SUMMARY OF THE INVENTION

The invention is broadly concerned with transference of, or, creation of, more general patterns, random or regular, which may be formed on surfaces, composed of two or three dimensions, or within liquids by means of a modulated high intensity beam of coherent energy such as a laser beam. The individual surface points so affected need not have importance as bits of information, but more generally, the pattern as a whole may be the important quantity.

According to the present invention, a self-timing optic lathe is provided in which each component of the lathe is capable of reliable independent synchronization., The optic lathe of the present invention facilitates the production of optical recordings including master discs for CD recording manufacture, as well as unique custom compilations of musical compact discs (CDs) and CD-ROM discs of alpha-numeric data.

According to one aspect of the present invention, a code track is located in an offset position, such as the outer surface of the turn-table on the optic lathe in a form and position which can be detected by associated apparatus. The signals so detected may be used to reliably operate various servosystems employed in the motion control and light beam operation subsystems of the optic lathe.

In accordance with a general aspect of the present invention, there is provided a self-timing optic lathe comprising a source of information data signal, a code track embodying a precise optical recording of a control signal, an object disposed in a predetermined location relative to said code track, write means for directing a first energetic beam at said object, read means for directing a second energetic beam at said code track for reading said control signal, means for establishing relative positioning of said first and second energetic beams relative to one another, and timing and control means for connecting to said source and said read means for receiving said information data signal and said control signal and in response controlling location and timely operation of said write means and said means for establishing relative positioning of said first and second energetic beams to record said information data signal on said object, whereby said control signal provides an acceptably precise reference to control said relative positioning.

BRIEF DESCRIPTION OF THE DRAWINGS

A preferred embodiment of the invention will be described in greater detail below with reference to the following drawings, in which.

DESCRIPTION OF THE PREFERRED EMBODIMENT

Figure 1:
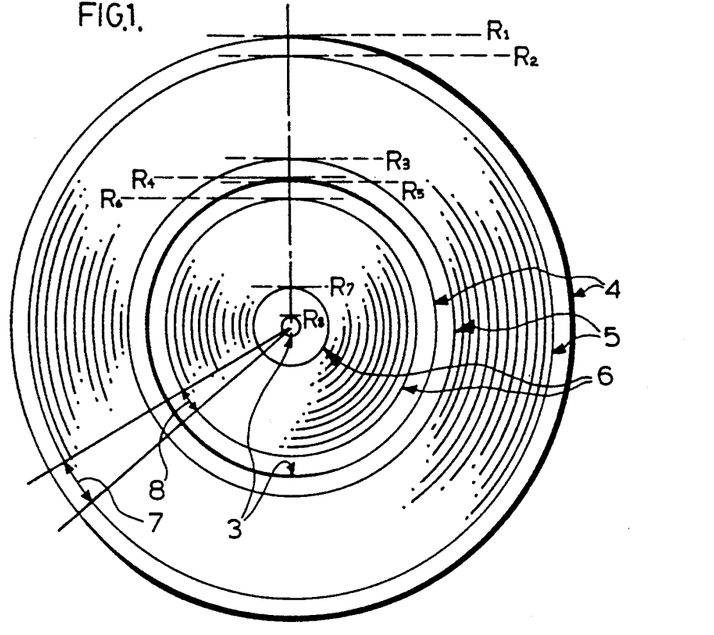
FIG. 1 is a plan view of an object disc carried by a turntable having an integral code track in accordance with the preferred embodiment.

Turning to FIG. 1, there is shown a turntable 4, the surface of which extends between the arcs defined by radii R1 and R4. The turntable 4 is adapted to rotate an object disc 3 occupying the distance between the arcs defined by radii R5 to R8.

Any compact disc recording on the object disc 3 would thus be located within the maximum information area 6 of the disc defined by the radial arcs from R6 to R7.

The object disc 3 is preferably located at the centre of the turntable 4 and fixed relative thereto in such a manner that the surface of the object disc 3 and the surface of the turntable 4 are coplanar and are substantially concentric for rotation about a common axis.

According to an aspect of the present invention, a code track 5 is recorded on a radial section of turntable 4 between radial arcs R2 and R3, preferably such radial section being equal to or greater than the maximum radial distance occupied by the information area 6 of the object disc 3 (i.e. from R6 to R7).

The code track 5 comprises an optical recording of high precision pit-edges (i.e. pits and lands) forming a spiral track with a pitch of preferably 1.6 $\mu$m.

In order to facilitate an understanding of the preferred embodiment, code track 5 may be considered to be a radially offset analogue of information on an optimally recorded compact disc in which the recorded frames are proportionally longer than usual as a result of radial displacement from the axis of rotation.

Figure 2:
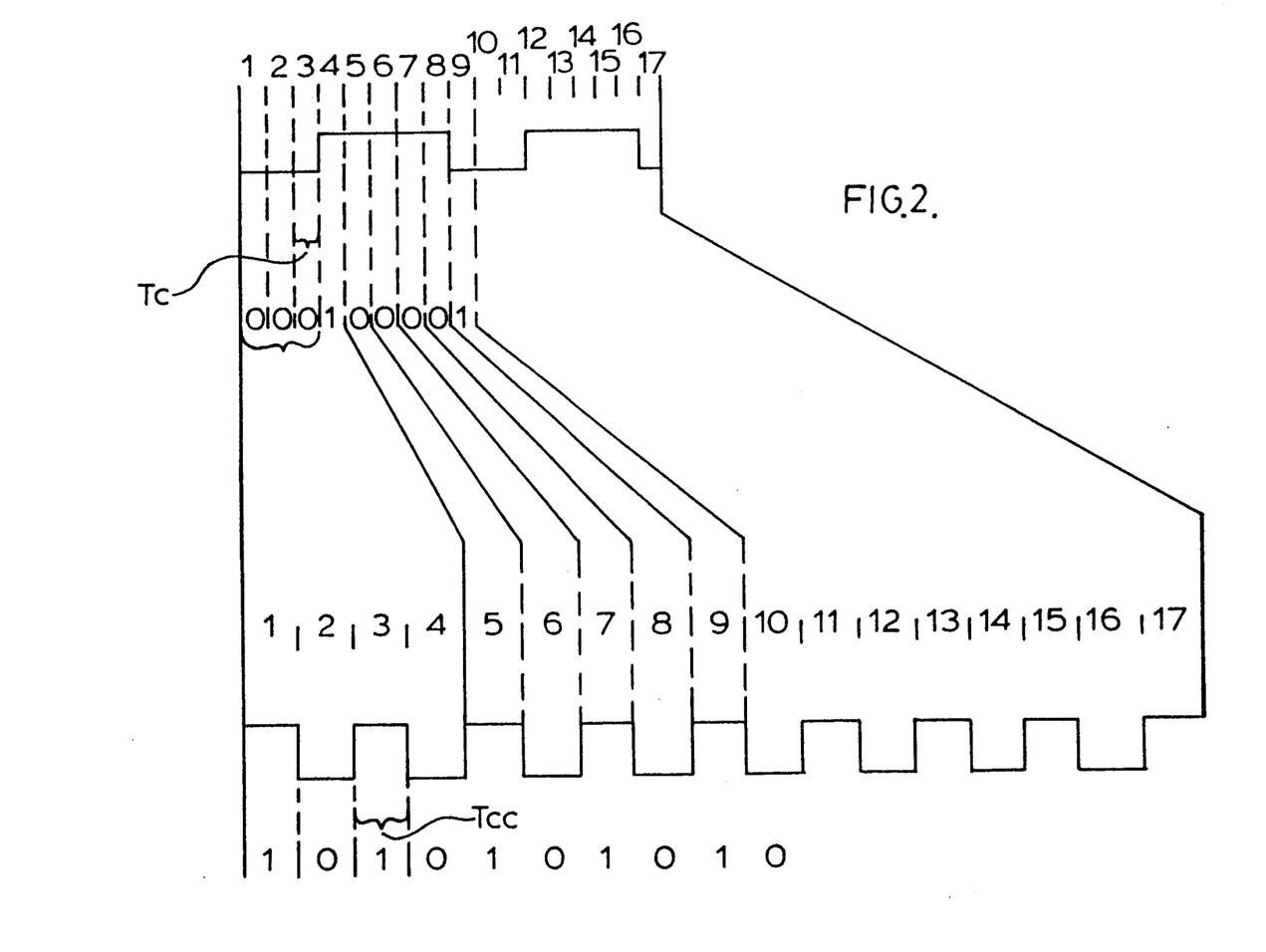
FIG. 2 is a schematic representation of an arbitrary segment of a single frame of an information signal recorded on the object disc and a corresponding segment of a frame of the code track in accordance with the embodiment of FIG. 1.

For example, the correspondence between a segment of one data frame 7 on code track 5 and a corresponding segment of a data frame on object disc 3 is illustrated with reference to FIG. 2. In particular, the arbitrarily selected segment of data frame 7 on the code track 5 is shown consisting of 17 timing bits corresponding to 17 channel bits of an information signal recording on the object disc 3. It should be noted that, while the code track 5 need not be an exact duplicate of the recording to be created on the object disc 3, it will preferably contain analogue "frames" which occupy identical portions of the radial arc occupied by frames of data representing the information signal on object disc 3. Furthermore, it should include sufficient pit-edges for defining formatting and timing information by which to determine the optimal location of each pit-edge which might be formed as part of a recording on the object disc 3.

Due to the greater length of the segment of code track frame 7 than the segment of object disc frame 8, sufficient track length is available within the code track to permit variations in the individual recording of ideal frames while still providing effective data for ensuring accurate location of pit-edges in the object disc 3.

In essence, each segment of frame 7 on the code track 5 effectively serves as a radially offset template for determining the recording location of corresponding segments of frames containing data to be recorded in the corresponding segment of frame 8 on the object disc 3. Thus, as shown in FIG. 2, the segment of code track frame 7 occupies a position which is radially offset from the ideal location for the information recording segment of object disc frame 8 which is to be written on the disc 3 at radius R5. In other words, according to the preferred embodiment, each pit or land of code track 5 (Tcc) represents the radial offset of one channel bit length (Tc), as it is referred to in Philips Technical Review volume 40, number 6, pages 159–162. In other embodiments of the invention, it is contemplated that the code track 5 may be encoded in such a manner that both the pit-edge locations of information on the object disc 3 may be determined as well as providing for retrieval of information stored within the frames of the code track 5 or upon one or more mutually adjacent spiral- tracks formed on the turntable 4. Other, and particularly, smaller laser footprints will permit more accurate tracking and larger data storage on the code track.

Allowing for the radial offset, it will be appreciated that the code track 5 may be made to replicate a number of the features which will characterize a recording present on the object disc 3 in any desired format. In most applications this replication would include the tracking pattern (i.e. whether spiral or concentric) and any formatting data patterns. With respect to the preferred embodiment, these elements will be understood to include a spiral track of pitch 1.6 $\mu$m, each track comprising a series of pit-edges organized as channel bits, the channel bits being further organized into frames of 588 channel bits including appropriate radial offsets of the conventional compact disc frame synchronization pattern (e.g. 24 channel bits), and appropriately encoded control and display bits.

Figure 3:
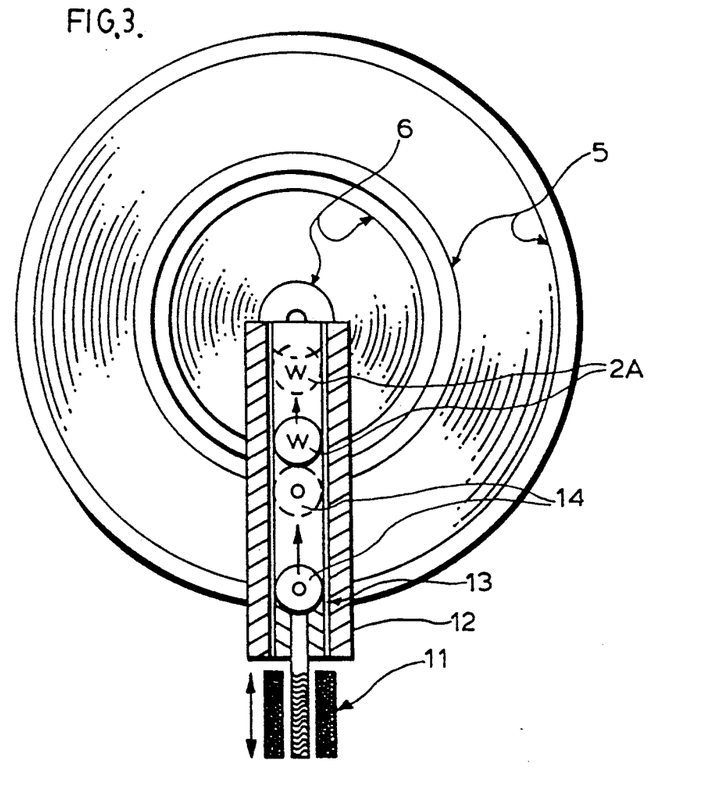
FIG. 3 is a plan view of an optic lathe in accordance with the preferred embodiment.

Turning to FIG. 3, an optic lathe is illustrated in accordance with the preferred embodiment for deriving a control signal from the code track 5 which can be used to control rotation of the turntable 4 and object disc 3, as well as for controlling operation of a write laser 1.

More particularly, FIG. 3 discloses apparatus for deriving information from code track 5 which can be used to produce a number of control signals whereby the conjoint rotation of the turntable 4 and object disc 3, radial translation and the location for frames of data, as well as the timely operation of a write-laser 1 can be appropriately determined so as to produce a reliable recording.

As in the operation of a CD player, locational information can be provided-by symbols recorded within the code track 5 in a manner analogous to the use of C&D bits which provide a locational signal in a conventional CD player.

In the embodiment of FIG. 3, the optic lathe of the present invention comprises a voice coil 11, a slideway 12 in substantial radial alignment with the turntable 4, an optical carriage 13 adapted to travel along the path prescribed by slideway 12 for a distance equal to, or greater than R2–R3 (FIG. 1), and a linkage coupling between the voice coil 11 and optical carriage 13.

The voice coil 11 is adapted to move the optical carriage 13 back and forth along the slideway 12 responsive to controlled energizing of the coil. The optical carriage 13 supports an optical pick-up 14 as well as a write laser 1 and read-after-write optical pick-up 2. The optical pick-up 14 and write laser 1 are disposed on optical carriage 13 such that the distance between the focus point for the optical pick-up 14 on code track 5 and the focus point for the write laser 1 on object disc 3 is equal to the radial offset of the code track 5 relative to the information area 6 on the object disc 3.

In operation, controlled movement of optical carriage 13 by voice coil 11 is effected in a manner similar to the tracking systems utilized in well known compact disc players, such as disclosed in the aforenoted Philips Technical review, volume 40, number 6 at page 154. In particular, the signal detected by a plurality of photodiodes in the optical pickup (14) as it scans the code track are employed to derive two tracking error signals whereby the radial translation of the optical carriage may be controlled. As discussed in the Philips article, one of the tracking error signals is corrected by the second tracking error signal in a manner which directs the motion of the optical pick-up to follow the track with an accuracy of $+/-$ 0.1 $\mu$m without being affected by the next or previous tracks, as will be discussed in greater detail below with reference to FIG. 6.

Figure 4:
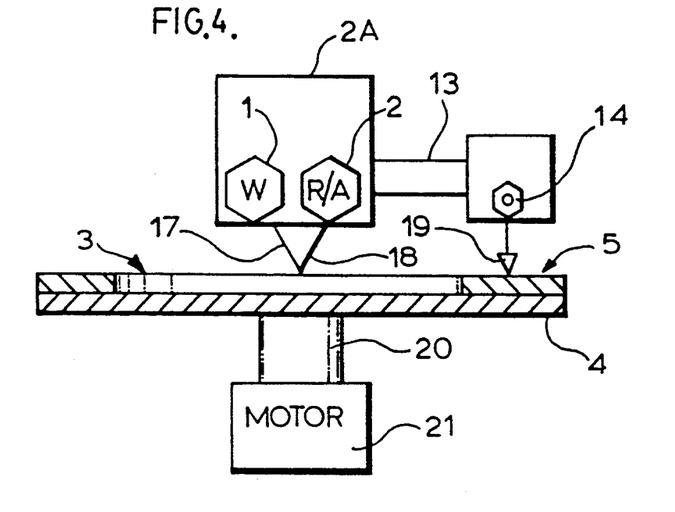
FIG. 4 is a schematic representation of the optic lathe of the preferred embodiment in elevation view.

Turning briefly to FIG. 4, the optic lathe of the preferred embodiment is shown schematically in elevation view comprising turntable 4 connected via spindle 20 to a motor 21. The object disc 3 is supported centrally on the turntable 4 and code track 5 is located in a radially offset position relative to the object disc 3 and on the same plane as a recording surface of the disc 3. Write laser 1 and read-after-write optical pick-up 2 are mounted within a housing 2A. Write laser 1 generates a write laser beam 17 while the read-after-write pick-up 2 generates a read-after-write beam 18. The housing 2A and optical pick-up 14 are supported via optical carriage 13. The optical pick-up generates an optical beam 19 for reading code track 5.

Figure 5A:
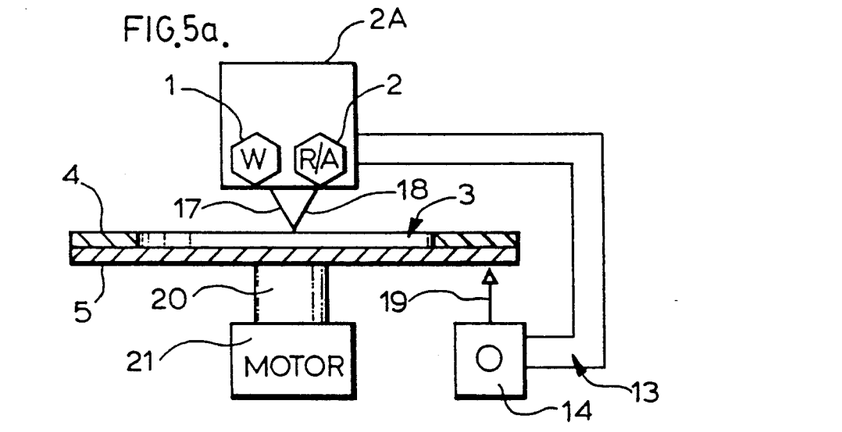
FIGS. 5a and 5b are schematic representations of first and second alternative embodiments of the optic lathe of the present invention.

According to a first alternative embodiment, shown in FIGS. 5a, the code track 5 may occupy a radially offset position on the under surface of turntable 4.

Figure 5B:
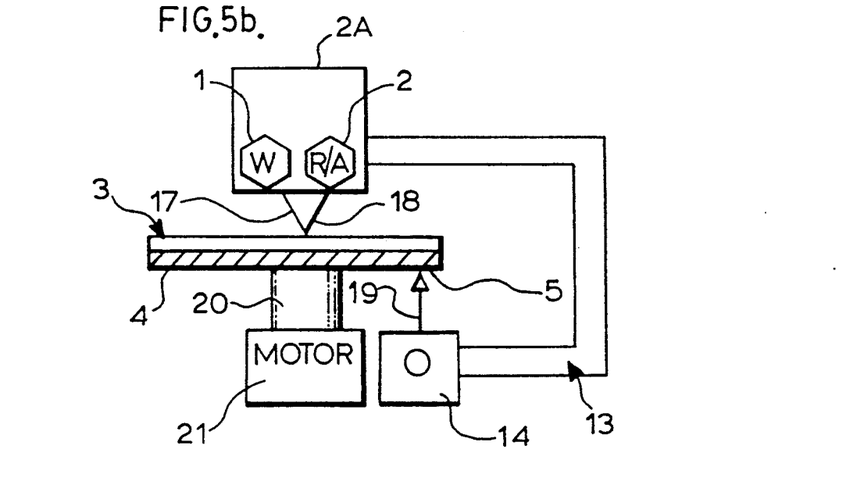

According to a second alternative, the code track 5 may occupy the underside of the turntable 4 in effectively the same radial position as that occupied by the object disc 3, as illustrated in FIG. 5b.

In each of the alternative embodiments shown in FIGS. 5a and 5b, the optical pick-up 14, write laser 1 and read-after-write optical pick-up 2 are mounted on an optical carriage 13 adapted to conform to the location of the code track 5.

As a further alternative, apparatus may be provided for eliminating optical carriage 13 and providing controlled rotation and radial translation of the turntable 4 and object disc 3 by means of a turntable transport (not shown) capable of moving the turntable while the optical array remains fixed.

Further alternatives may include other means whereby the object disc and the code track may be conjointly moved including but not limited to, placing each on opposite ends of a spindle or effectively similar linkage.

Likewise, the offset code track need not be formed exclusively as a direct radial offset of an object disc, the code track may be formed so as to facilitate alternative means of disc scanning whereby the motion and operation of the write beam may be controlled. The simplest of these entails a code track formed so as to provide control and operation of a rotating arm or similar device comparable to the arm in a conventional CD player, carrying both the optical pick-up and the write-laser. While such a code track is more difficult to form, the mechanical simplicity of the rotating arm may provide manufacturing simplicity.

Further, the offset code track is not limited to concentric or spiral tracks on a disc, but may take any desired form on any surface or shape provided only that adequate provision for either mechanical means, optical means or a combination of such means is made for scanning the track and determining relative position with respect to the target or object on which the write-laser and/or read-after-write laser is operated.

Likewise, other mechanical alternatives to the voice coil 11, optical carriage 13 and slideway 12 may be provided by devices including, but not limited to, Cardan gearing with or without yokes, parallel linkages, linear motors, lead screws, all such alternatives being appropriately controlled by the various control signals derived from the code track 5 in accordance with the principles of the invention.

Figure 6:
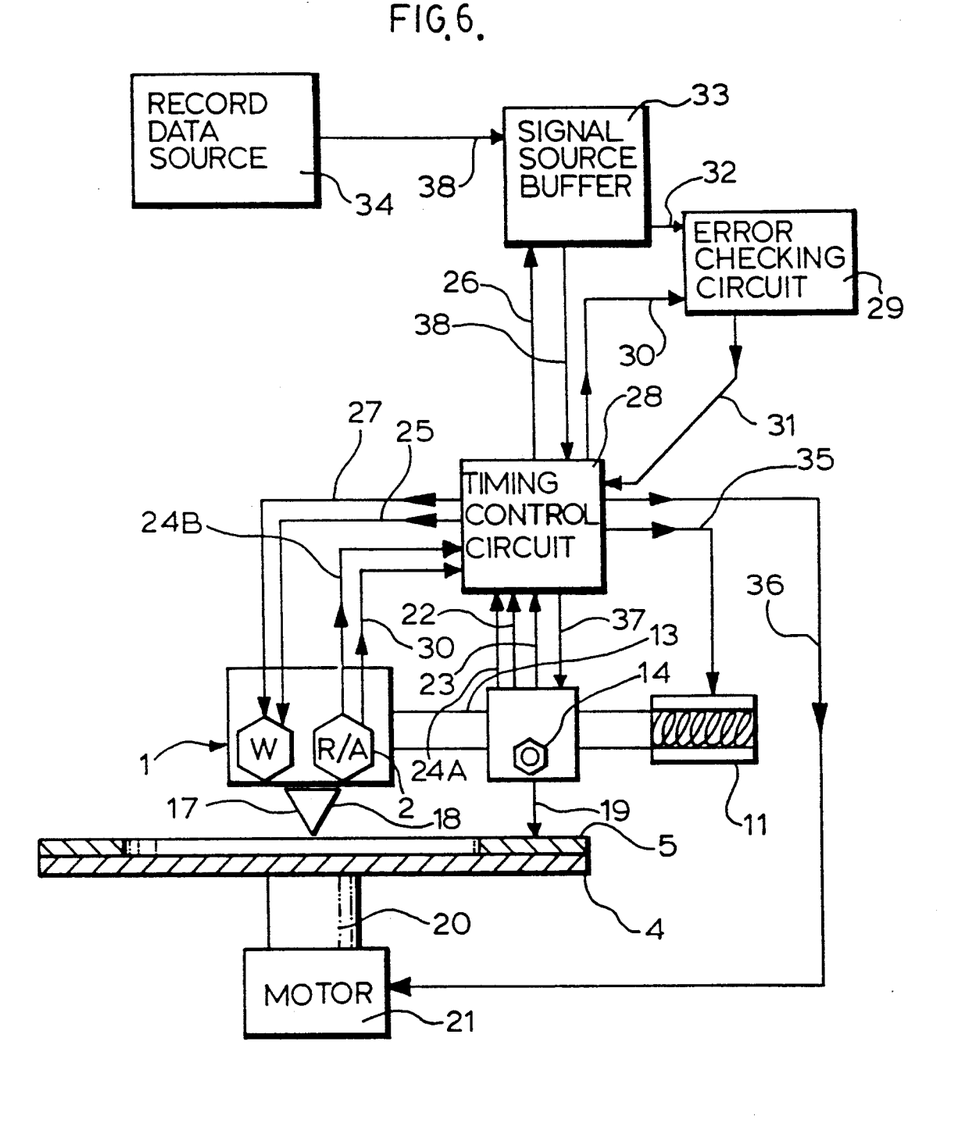
FIG. 6 is a detailed schematic representation of the optic lathe according to the preferred embodiment.

Turning to the detailed schematic representation of FIG. 6, a plurality of control signals such as timing control signal 22, tracking error signal 23 and focus error signal 24A may be derived from the encoded code track 5 via optical pick-up 14.

The control and error signals 22 and 23 are received by a timing control circuit 28 which in response generates write laser control signal 27, radial translation control signal 35 and rotation speed control signal 36.

The radial translation control signal 35 is derived from tracking error signal 23 in a well known manner, and causes voice coil 11 to be energized for moving the optical pick-up 14 via carriage 13 in order to follow the optical recording of the code track 5 with the aforementioned accuracy of $+/- 0.1$ $\mu$m.

Further adjustment of radial alignment of the slideway 12 or of write laser 1 may be effected manually or by means of controlled servomechanisms as discussed below with reference to FIGS. 7a-7c and 8. However, because existing specifications for maximum side-to-side swing of a compact disc track are in the vicinity of 300 $\mu$m, such additional high accuracy adjustment is not believed to be an essential requirement for the purposes of the preferred embodiment.

The reflected light beams 19 and 18 detected by the aforenoted photodiode arrays associated with the optical pick-ups 14 and 2 respectively, can be used to derive corresponding focus error signals 24A and 24B in a manner comparable to that employed within conventional CD optical pick-ups. These focus error signals 24A and 24B may then be used to derive respective focus control signals 25 and 37 with which to control the focus operation of each pick-up, as well as to control the operation of the write laser 1 with respect to focus, in a well known manner. In particular, the focus control signals 25 and 37 can be used to control the displacement of objective lenses (not shown) employed in the optical pick-ups 14 and 2. Likewise, focus control signal 25 derived from the photodiodes associated with the read-after-write pick-up 2 may be used to control the focus of the write laser 1 during the writing operation. By these well known techniques, any deviation in focussing can be limited, and the maximum allowable misalignment of the surface of turntable 4 relative to the object disc 3 may be controlled within certain tolerances.

In operation, optical pick-up 14 scans the code track 5 for the detection of pit-edges to provide a timing control signal 22 which is received by timing control circuit 28. In response, timing and control circuit 28 generates and transmits a rotation speed control signal 36 to the motor 21 which in response controls rotation of the spindle 20 attached to turntable 4 so that the turntable and object disc 3 are simultaneously rotated. The timing control signal 22 is also employed by the circuit 28 in order to produce a write laser control signal 27, the control signal 27 is of sufficient accuracy to control the operation of writs laser 1 such that the frames and pit-edges constituting any desired specific recording may be formed in the appropriate manner on object disc 3. The timing control circuit 28 also produces a source data timing signal 26 for ensuring that the buffered information signal data received from signal source 34 is retrieved from signal source buffer 33 at an appropriate rate during the write operation.

A current-record-information-signal 30 is detected by read-after-write optical pick-up 2 and transmitted to the timing control circuit 28 for comparison with the received source data stream 38 from record data source 34 in order to ensure accuracy of the current recording on object disc 3. Further, if required, the current-record-information-signal 30 may be retransmitted by timing control circuit 28 for application to an error checking circuit 29. Error checking circuit 29 compares the signal 30 with a source data checking signal 32 from signal source buffer 33 in order to determine whether the current recording falls within the relevant recording standards of error correction employed in the production of compact discs or any other optical recording for which the optic lathe has been configured.

In actual practice the signals 24B and 30 are in the form of one information signal which can be used to derive both focus control data and recorded data on the disc.

Thus, according to an aspect of the present invention, the radial motion described by optical pick-up 14 as it traverses the code track 5 results in corresponding translation of the write laser 1 over the surface of conjointly rotated turntable 4 and object disc 3. In addition, the various control signals 22, 23 and 24A are derived from optical pick-up 14 as it scans code track 5 for use by the timing control circuit 28 to coordinate rotation and radial translation with the operation of the write laser 1. Hence, a satisfactory compact disc recording of information signal from data source 34 may be formed on the object disc 3, without a requirement for expensive and complicated apparatus for maintaining synchronism of the various subsystems relative to a timebase.

According to a further aspect of the present invention, various alignment apparatus are provided, based on standard loudspeaker principles.

Figure 7A:
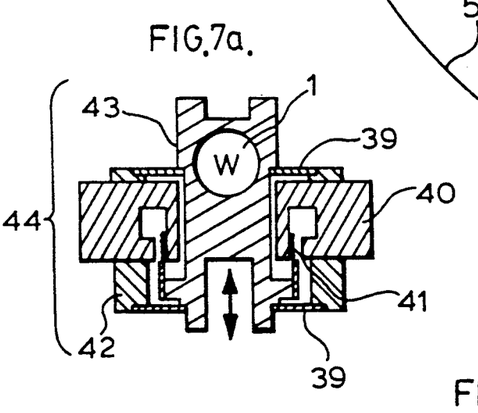
FIGS. 7a, 7b and 7c are schematic representations of various loudspeaker alignment means in accordance with a further aspect of the present invention.

More particularly, with reference to FIG. 7a, a write laser 1 is shown mounted to a laser mount 43 which may be displaced in the manner of a loudspeaker when drive coil 41 is energized. The drive coil 41 is disposed between opposite poles of a permanent magnet 40 which supports the laser mount 43 via springs 39. The support 42 may in turn may be mounted on the optical carriage (not shown). The controlled activation of drive coil 41 can therefore be used to more precisely align the substantially aligned radial offset of the write laser 1 with respect to source data being recorded on the object disc 3 in a manner analogous to that employed for maintaining focus by controlled displacement of an objective lens during conventional scanning of a compact disc, as disclosed in Philips Technical Review Volumes 33 and 40.

It is also contemplated that the servomechanism of FIG. 7a can be made very small and can be incorporated in a number of ways for use in more precise alignment of various component parts of the optic lathe. In addition, electromagnetic locking devices may be readily deployed to hold any such alignment as may be required in specific embodiments.

Figure 7B:
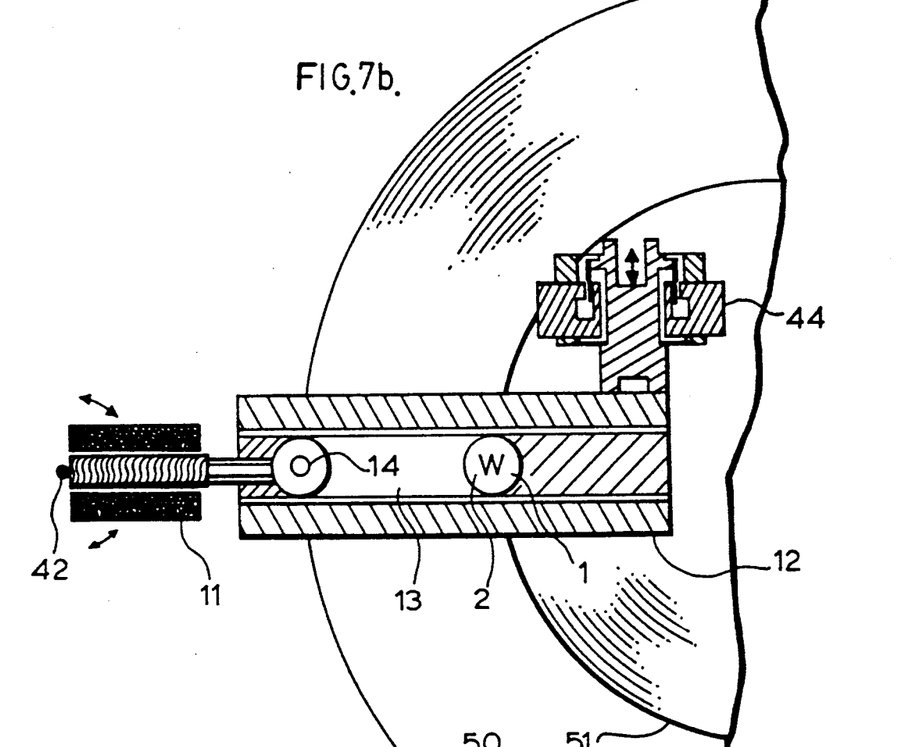

Furthermore, according to the embodiment illustrated in FIG. 7b, a loudspeaker-type alignment adjustment mechanism can be deployed for maintaining precise radial alignment of the slideway 12. In this embodiment, the slideway alignment apparatus 44 is rigidly connected to a portion of the optic lathe (not shown) such that upon energizing the drive coil, one end of the substantially aligned slideway 12 may be caused to rotate around a pivot point 45 at its other end.

The embodiment of FIG. 7b also illustrates two concentric alignment tracks 50 and 51 which are formed on the code track 5 with a radial separation conforming to the specific radial offset of the code track relative to the information area on the object disc 6. The slideway 12 in the embodiment of FIG. 7b is slightly enlarged for permitting the optical carriage 13 to be positioned such that the read-after-write beam 18 produced by optical pick-up 14 is incident over the inner alignment track 51 while the optical beam 19 produced by optical pick-up 2 is incident over the outer alignment track 50.

In operation, the slideway alignment apparatus 44 may be controlled responsive to signals derived when pit-edge locations formed on the outer track 50 are detected by the optical pick-up 14 are compared within timing control circuit 28 to the pit-edge locations formed on the inner alignment track 51 which are detected by read-after-write optical pick-up 2. The timing of the identical bit streams recorded on the inner and outer alignment tracks 50 and 51 derived from these signals may be used to determine radial alignment of the slideway and to produce the requisite control signals for the activation of the slideway alignment apparatus 44 so that the energy delivered to its drive coil 41 may produce acceptable radial alignment.

Figure 7C:
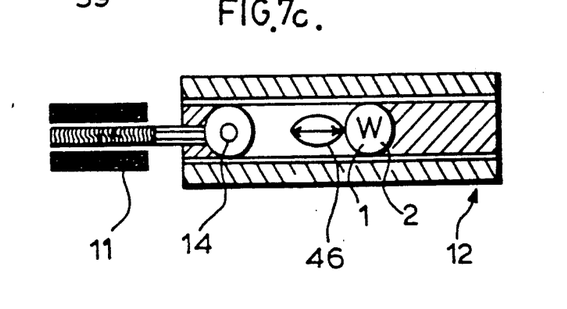

Turning to FIG. 7c, a comparable "loudspeaker" alignment apparatus is shown deployed as a radial offset servomechanism 46 by which it is possible to provide for more precise adjustment of the substantially precise radial offset between the optical pick-up beams 18 and 19, and as a consequence more precise radial offset of the radial distance between the incident point of the optical beam 19 and the incident point of the write beam 17 produced by write laser 1. The radial offset servomechanism 46 comprises a coil and a permanent magnet mounted relative to the optical carriage 13 and write laser 1, and connected to read-after-write optical pick-up 2 in such a way that when the coil is energized the conjointly mounted write laser 1 and read-after-write optical pick-up 2 are simultaneously displaced to assure acceptably precise radial offset.

It is further contemplated that the substantially aligned radial offset may be more precisely adjusted by the track following operations performed by voice coil 11 in the manner discussed above using the outer alignment track 50 as a reference while radial offset alignment apparatus 46 simultaneously uses the inner alignment track 51 as a reference. In each of the above discussed embodiments, tracking error signals are . detected in a manner to produce appropriate tracking control signals.

Figure 8:
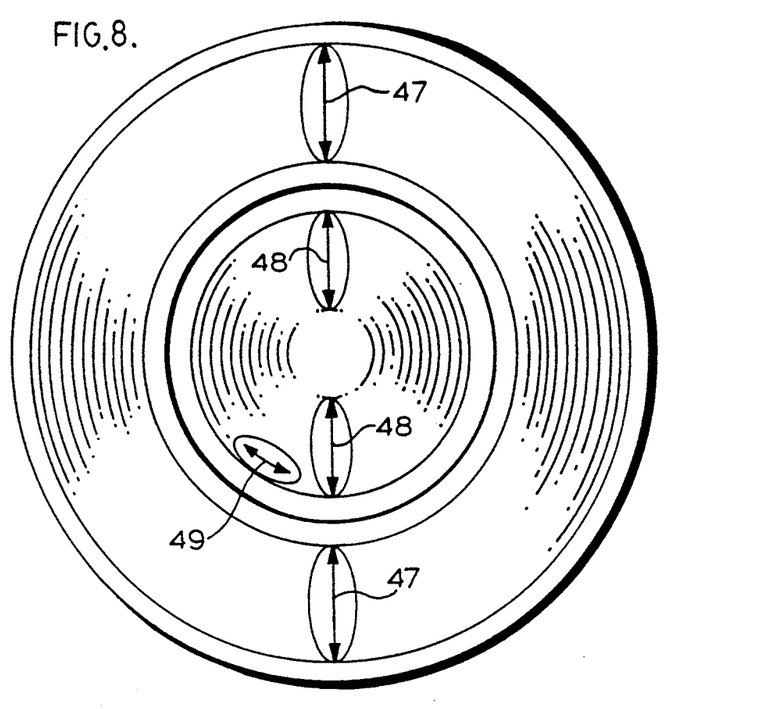
FIG. 8 is a schematic representation of various alignment servomechanisms in accordance with an additional aspect of the present invention.

With reference to FIG. 8, a pair of orthogonally disposed turntable alignment servomechanisms 47 are shown schematically for connection to the turntable 4. The servomechanisms 47 each comprise a coil and permanent magnet as discussed with reference to FIGS. 7a–7c and may be affixed at the junction of the turntable 4 and code track 5 such that when the coils are energized appropriately, the code track 5 may be more precisely concentrically located relative to the axis of rotation. Similarly, disc alignment servomechanisms 48 are shown which may be affixed at the junction of the turntable 4 and the object disc 3 so that the object disc may be similarly concentrically located relative to the code track 5. These servomechanisms are operated in the same manner as discussed above with reference to the radial offset servomechanism 46.

A disc transport alignment servomechanism 49 is also illustrated in FIG. 8, comprising a coil and permanent magnet mounted so as to effect precise radial alignment of the object disc transport. In operation, the coil of servomechanism 49 is energized such that the object disc 3 may be made to rotate about its axis until satisfactory radial alignment with the code track 5 is attained. Control signals required for this operation may be derived in the same manner as discussed above with reference to the controlled radial alignment of the optical carriage and slideway. It will be understood that the object disc transport may be made to engage the object disc 3 by conventional apparatus such that the object disc 3, turntable 4 and code track 5 may be substantially aligned before the various alignment functions discussed above are undertaken.

Figure 9:
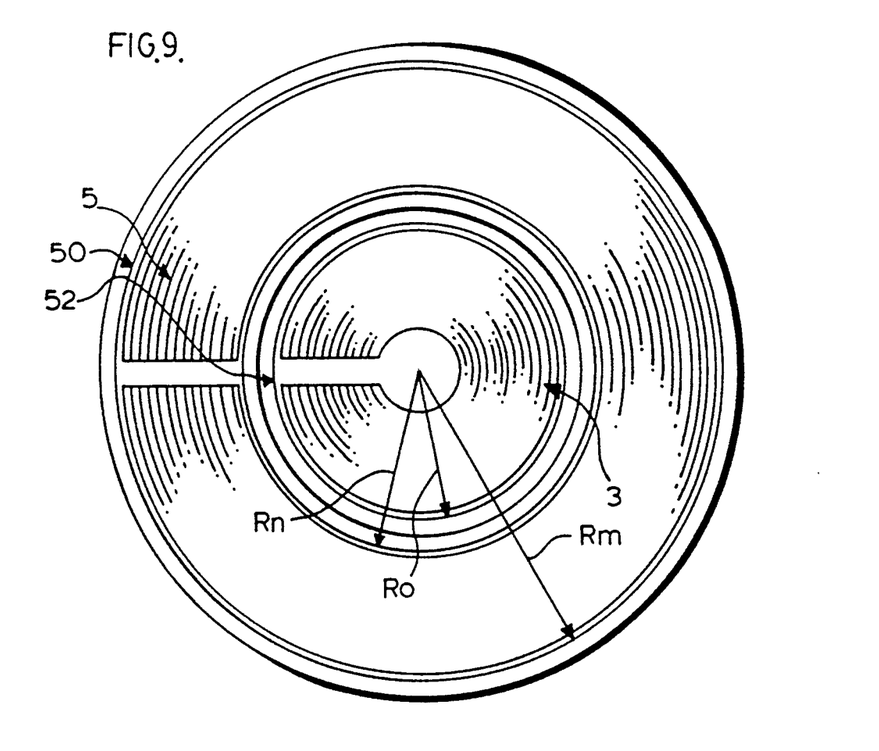
FIG. 9 is a plan view of an object disc and turntable being provided with alignment tracks in accordance with the additional aspects of the present invention depicted in FIGS. and 8 and 9.

In accordance with the embodiment of FIG. 9, a single alignment track 50 may be formed at a radius Rm provided that the dimensions of slideway 12 are increased to a length of greater than 2 Rm, and provision is made for a second optical pick-up (i.e. similar to optical pick-up 14), the slideway alignment mechanism 44 being positioned on the optical carriage 13 in diametrical opposition to the first optical pick-up 14.

It is further contemplated that in the event that any combination of the aforenoted alternatives are intended to facilitate interrupted recording on an object disc, the alignment sequence can be expanded. In this case, the code track 5 may include a secondary concentric alignment track (not shown), located for guiding the formation of the object disc alignment track 52 at radius Ro, such that the alignment tracks are formed at the appropriate radial offset of Rm–Rn.

In such a configuration, optical carriage 13 may be directed to a position for permitting a secondary alignment track and object disc alignment track 52 to serve as the sources of reference signals in the same manner as discussed above with reference to outer and inner alignment tracks 50 and 51. The interrupted recording on the object disc 3 and the code track 5 may be thereby radially and concentrically aligned and radial offset. Each of the aforementioned controls of radial alignment, radial offset and concentricity may be improved by a procedure comparable to that employed to establish radial alignment of slideway 12, with the exception that these alignment controls would be accomplished by operation of the disc transport alignment servomechanism 49 (FIG. 8).

Similarly, tracking error signals derived from the read-after-write beam 18 may be used to adjust the axial position of the object disc 3 by controlling operation of the disc alignment servomechanism 48 in order to achieve a desirable degree of concentricity between the turntable 4, code track 5 and object disc 3.

Where required, the focus error signals 24A and 24B and focus control signal 25 (FIG. 6) may b& employed with similar servo-systems to provide more precise alignment of the surfaces of the control track 5 and object disc 3 with respect to both depth and skew.

Additional embodiments and variations of the present invention as well as further applications thereof are contemplated.

For example, multiple write lasers may be deployed on a single optical carriage 13, each write laser being synchronized by a predetermined independently determinable timing signal produced as a result of data received from the code track 5. Alternatively, a number of optical carriages may be deployed to achieve the same end, or various optical and optical/mechanical means may accomplish the same end.

In addition, the control of formatting and recording parameters provided by the present invention permits the development of new optical disc formats. For example, the inclusion of look-up tables as part of the data stored on the code track 5 may be used to encode information signals in data compression and/or encryption systems.

Similarly, the code tracks need not be limited to a single spiral track. The formation of two or more mutually adjacent spirals can be used to form corresponding mutually adjacent spirals on the object disc 3, thus facilitating multitrack audio recordings or user segregated records for shared use applications.

Additional embodiments may incorporate magnetic surfaces typically used in hard discs on one of the available surfaces of the turntable 4 not occupied by the code track 5 or object disc 3. Such hybrid magnetic/optical devices may be employed as temporary storage elements when preparing files for recording,, prior to initiating permanent optical recording of the data on object disc 3.

The data received from code track 5 may also be used to control reading of data from optical discs. In particular, the provision of reliable timing signal information on code track 5 can take the place of rotational control circuits necessary to measure intervals between pit-edges and thus facilitate the acquisition of data from the object disc within a larger than normal range of track speeds. For instance, two or more optical carriages may be employed to read data from the disc simultaneously. Data acquired in this manner may be held in a buffer memory before being reconstituted with respect to time.

Similarly, there are alternatives for other components of the present invention including but not limited to the substitution of another form of energetic electromagnetic beam such as an electron beam for the write laser I and a wide range of alternative control methods and means can be applied to the processing and application of the tracking-control signals, the timing signals, etc.

Similarly, the lasers and optical pick-ups stipulated as being part of the optical array need not be physically located on the optic lathe, provided that suitable modifications are made for directing the beams via a mirror such as disclosed in U.S. Pat. No. 4,494,226. Similarly it is understood that the optically detectable changes referred to heretofore as "pit-edges" which are produced in the surface of the object disc 3 by the action of the write laser beam 17 need not be physical changes, such as pits and holes. Similarly, the object disk employed may be any one of several types such as the trilayer optical disc disclosed in U.S. Pat. No. 4,222,071.

Further, the invention is not limited to these embodiments. By variation of its elements the invention can be adapted to the formation of optical recordings in any rotating format whether such optical recording tracks are formed concentrically, in spirals, in radial blocks, etc. provided such formatting data can be derived from a recording on the code track 5 of the turntable 4. Such applications include, but are not limited to, the recording of data on so-called CD-ROM, CD-I, WORM drives, Laservision TM recordings, two-sided recording formats whether such recordings encode conventional data or holographic recordings, and any pattern of tracks on so-called "smart cards". This latter embodiment may require a modification of the turntable 4 so that a substantially rectangular card may occupy the position reserved for the object disc 3 in the present embodiment.

In addition, it is contemplated that high precision micro-machined parts, computer circuits, gate arrays, etc., may be finished or programmed as the case may be, by burning the various segments of the product (i.e. gates, etc.) based on information received from the code track 5.

In like manner, a pair of optical carriages may be mounted at an angle to each other and so interconnected as to provide precise locational control and timely operation of the energetic beam in two dimensions over a non-rotating object. For example, such a device may be used to control two dimensional location of the incident point for a laser, other energetic beam or device mounted thereon, such laser point being focused on an object mounted at the centre of the drive or elsewhere (e.g. beyond the radius of the turntable), which need not rotate. The combination of rapid and precise locational determination made possible by use of the code track results in application of the principles of the present invention to the formation of objects or images such as photocopies, photographs, prints and drawings. If provided with pens or comparable devices in place of the laser or other energetic beam, the principles of the present invention may be employed in still other embodiments as a plotter or printer.

Furthermore, in some applications it may be desirable to incorporate all or part of the code track 5 on the object disc itself while retaining its offset position relative to the information recording area.

Indeed, as an alternative to encoding the code track 5 on a disc, or any other 2-dimensional surface, such a track may be encoded on three-dimensional geometric surface (e.g. cylinder), for applications such as testing of castings or other high precision parts. The essential aspect of the invention which lends itself to a multitude of applications is the ability to control location and operation of the laser (or other energetic beam or device) relative to the code track which, in accordance with the principles of the present invention, conforms to a fixed spatial relationship with the object.

Thus, as an extension of the three dimensional application of the invention, a laser or other energetic beam may be controlled to focus energy upon a three dimensional object such as a photoreactive polymer in order that surfaces, and indeed entire objects may be formed within the polymer by stereo lithography. In turn, the polymer may be employed to form machine parts, etc.

Similarly, the high degree of motion control made possible by reference to the code track, however formed, may be used to provide substantial control of a wide range of robotic devices.

Moreover, as discussed above with reference to the application for reading of optic discs, the high degree of alignment and precision provided by the apparatus of the present invention may be used in a number of additional embodiments as a precise measuring device for measuring one, two, or three dimensional objects. For practical purposes, the resolving capability of this measurement application of the present invention is somewhat lower than that of an electron microscope, but substantially above that of an optical microscope. In short, the principles of the invention may be applied to the construction of a mapping laser-optical microscope because each detectable variation can be plotted. Further, it is believed that variable configurations of the photodiode array can further enhance the resolving capacity by, in effect, comparing reflectance patterns from adjacent Points and inferring the likely patterns to a substantially higher degree of accuracy.

All these and other contemplated embodiments are believed to be within the sphere and scope of the Present invention as defined by the claims appended hereto.

We claim:

1. A self-timing optic lathe, comprising:
   a) a source of information data signal;
   b) a code track embodying a precise optical recording of a control signal;
   c) an object disposed in a predetermined location remote from said code track;
   d) write means for generating and directing a first energetic beam at said object;
   e) read means for generating and directing a second energetic beam at said code track for reading said control signal;
   f) means for establishing relative positioning of said first and second energetic beams;
   g) means for establishing conjoint relative movement between said read means and said code track and between said object and said write means; and
   h) timing and control means for receiving said information data signal and said control signal and in response controlling said conjoint relative movement and timely operation of said write means and controlling said means for establishing relative positioning of said first and second energetic beams to record said information data signal on said object.

2. A self-timing optic lathe as defined in claim 1, further comprising a carriage for supporting said read means and said write means in a predetermined fixed spatial relationship adjacent said object and said code track respectively.

3. A self timing optic lathe as defined in claim 2, wherein said timing and control means further comprises means for receiving said control signal and in response controlling movement of said carriage to align said read means with said optical recording of said control signal embodied within said code track.

4. A self-timing optic lathe as defined in claim 1, wherein said write means comprises a write laser for burning an information signal into said object in the form of pits and lands.

5. A self-timing optic lathe as defined in claim 1, wherein said code track is incorporated within a turntable for supporting said object.

6. A self-timing optic lathe as defined in claim 1, wherein said read means comprises an optical pick-up for detecting said control signal embodied within said code track.

7. A self-timing optic lathe as defined in claim 1, wherein said timing and control means further comprises means for receiving said control signal and in response controlling relative movement between said first energetic beam and said object and between said second energetic beam and said code track.

8. A self-timing optic lathe as defined in claim 1, wherein said timing and control means further comprises means for receiving said control signal and in response synchronizing recording of said information data signal with said relative positioning.

9. A self-timing optic lathe, comprising:
   a) a turntable for rotating an object disc;
   b) a write laser for optically recording an information signal on said object disc;
   c) a code track carried by said turntable and embodying an encoded control signal;
   d) a read laser for optically reading said encoded control signal from said code track;
   e) an optical carriage for moving said write laser and said read laser across said turntable relative to said code track; and
   f) a timing and control circuit connected to said write laser and said read laser for receiving said control signal and said control signal and in response controlling rotation of said turntable and operation of said write laser to record said information signal independently of speed of rotation of said turntable.

10. A self-timing optic lathe as defined in claim 9, further comprising a read-after-write laser mounted on said optical carriage adjacent said write laser for reading said information signal recorded on said object disc and transmitting said information signal to said timing and control circuit.

11. A self-timing optic lathe as defined in claim 10, wherein said timing and control circuit further comprises means for receiving said information signal from said read-after-write laser and in response controlling focussing of said write laser.

12. A self-timing optic lathe as defined in claim 10, wherein said timing and control circuit further comprises means for receiving said information signal from said read-after-write laser and in response performing a check of said information signal prior to recording.

13. A self-timing optic lathe as defined in claim 9, wherein said timing and control circuit further comprises means for controlling the focussing of said read laser.

14. A self-timing optic lathe as defined in claim 10, further comprising means for comparing said information signal recorded on said object disc with said information signal prior to recording on said object disc in order to detect errors in said object disc.

15. A self-timing optic lathe as defined in claim 9, further comprising:
   a) a radial slideway for carrying and providing a radial path for movement of said optical carriage relative to said turntable; and
   b) a voice coil connected to said optical carriage for moving said optical carriage in said radial slideway under control of said timing and control circuit.

16. A self-timing optic lathe as defined in claim 9, wherein said code track is in the form of a spiral pattern of pits and lands extending around an outside periphery of said turntable.

17. A self-timing optic lathe as defined in claim 16, wherein said object disc has predetermined radius and is disposed centrally of said turntable, said code track being radially offset from said object disc.

18. A self-timing optic lathe as defined in claim 17, wherein said code track and said object disc are disposed on one surface of said turntable.

19. A self-timing optic lathe as defined in claim 17, wherein said code track and said object disc are disposed on opposite surfaces of said turntable.

20. A self-timing optic lathe as defined in claim 16, wherein said object disc and said code track occupy approximately equal radial area on opposite surfaces of said turntable.

21. A self-timing optic lathe as defined in claim 10, further comprising:
   a) a radial slideway for carrying and providing a radial path for movement of said optical carriage relative to said turntable;
   b) means for effecting pivotal rotation of said slideway at one end thereof;
   c) a rigidly supported housing;
   d) a permanent magnet supported by said housing;
   e) a drive coil connected to an opposite end of said slideway between opposite poles of said permanent magnet;
   f) an outer alignment track disposed on said turntable and adapted to be read by said read laser;
   g) an inner alignment track disposed on said turntable and adapted to be read by said read-after-write laser, said inner and outer alignment tracks containing identical concentrically arranged bit patterns and being separated by a distance substantially equal to the radial offset between said code track and said object disc; and
   h) means for receiving and comparing said bit patterns read by said read laser and said read-after-write laser and in response generating a radial control signal for energizing said drive coil and thereby pivoting said slideway relative to said rigid housing for correcting radial misalignment between said read laser and said read-after-write laser.

22. A self-timing optic lathe as defined in claim 10, further comprising a radial offset servomechanism connected to said optical carriage intermediate said read laser and said read-after-write laser for detecting alignment of said read laser and said read-after-write laser relative to said code track and said recorded information signal respectively, and in response adjusting the distance between said read laser and said read-after-write laser to maintain a predetermined radial offset.

23. A self-timing optic lathe as defined in claim 21, further comprising a pair of orthogonally disposed turntable alignment servo mechanisms for detecting alignment of said read laser with one of either said code track or said outer alignment track and in response adjusting the position of said turntable relative to the axis of rotation for minimizing eccentricities of rotation of said code track relative to said read laser.

* * * * *

UNITED STATES PATENT AND TRADEMARK OFFICE
CERTIFICATE OF CORRECTION

PATENT NO. : 5,303,215
DATED : April 12, 1994
INVENTOR(S) : Stephen DeWar

It is certified that error appears in the above-indentified patent and that said Letters Patent is hereby corrected as shown below:

Title page:

Item [76] change "W.#601," to --W.#201,--;

Change "178-193" to --187-193--;

Column 3, line 24, change "tion.," to --tion.--;

Column 8, line 18, change "writs" to --write--;

Column 11, line 14, change "b&" to --be--;

line 66, change "I" to --1--;

Column 13, line 30, change "Points" to --points--;

line 33, change "Pres-" to --pres---;

Column 14, line 39, After "receiving" delete "said control signal and said control" insert --said information signal and said control--

Signed and Sealed this

Second Day of July, 1996

Attest:

Attesting Officer

BRUCE LEHMAN

Commissioner of Patents and Trademarks